(12) United States Patent
Haro et al.

(10) Patent No.: US 9,826,345 B2
(45) Date of Patent: Nov. 21, 2017

(54) METHOD AND APPARATUS FOR DETECTING POINTS OF INTEREST OR EVENTS BASED ON GEOTAGGED DATA AND GEOLOCATION SEEDS

(75) Inventors: Antonio Haro, Oak Park, IL (US); Jane MacFarlane, Oakland, CA (US)

(73) Assignee: HERE GLOBAL B.V., Veldhoven (NL)

( * ) Notice: Subject to any disclaimer, the term of this patent is extended or adjusted under 35 U.S.C. 154(b) by 323 days.

(21) Appl. No.: 13/525,949

(22) Filed: Jun. 18, 2012

(65) Prior Publication Data

US 2013/0337830 A1    Dec. 19, 2013

(51) Int. Cl.
| | |
|---|---|
| H04Q 7/10 | (2006.01) |
| H04W 4/02 | (2009.01) |
| G06Q 30/02 | (2012.01) |
| G06Q 50/00 | (2012.01) |
| H04W 4/20 | (2009.01) |

(52) U.S. Cl.
CPC .............. *H04W 4/02* (2013.01); *G06Q 30/02* (2013.01); *G06Q 50/01* (2013.01); *H04W 4/206* (2013.01)

(58) Field of Classification Search
CPC ........... H04W 4/00; H04W 4/02; H04W 4/23; H04W 4/18; H04W 4/185
USPC .......................... 455/456.3, 456.1, 457, 466
See application file for complete search history.

(56) References Cited

U.S. PATENT DOCUMENTS

| | | | |
|---|---|---|---|
| 7,486,958 B2 | 2/2009 | Sheha et al. | |
| 8,019,534 B2 | 9/2011 | Jung et al. | |
| 8,326,327 B2 * | 12/2012 | Hymel et al. | 455/456.3 |
| 8,612,134 B2 * | 12/2013 | Zheng | G01S 19/14 701/400 |
| 2008/0132251 A1 * | 6/2008 | Altman et al. | 455/457 |
| 2009/0005968 A1 * | 1/2009 | Vengroff | G06F 17/3087 701/425 |
| 2009/0089417 A1 | 4/2009 | Giffin et al. | |
| 2010/0023259 A1 | 1/2010 | Krumm et al. | |
| 2010/0057351 A1 | 3/2010 | Woo | |
| 2010/0331016 A1 * | 12/2010 | Dutton et al. | 455/456.3 |
| 2013/0344895 A1 * | 12/2013 | Glachant et al. | 455/456.2 |

OTHER PUBLICATIONS

Notification of Transmittal of the International Search Report and the Written Opinion of the International Searching Authority, or the Declaration for International Application No. PCT/EP2012/074068, dated Mar. 1, 2013, 11 pages.

(Continued)

*Primary Examiner* — Ajit Patel
*Assistant Examiner* — Julio Perez
(74) *Attorney, Agent, or Firm* — Ditthavong & Steiner, P.C.

(57) ABSTRACT

An approach is provided for detecting points of interest or events based on geotagged data and geolocation seeds. A maps platform processes and/or facilitates a processing of location information associated with one or more devices to determine one or more geolocation seeds. The maps platform causes, at least in part, a querying for content information based, at least in part, on the one or more geolocation seeds. The maps platform then processes and/or facilitates a processing of the content information to determine one or more points of interest, one or more location-based events, or a combination thereof.

23 Claims, 13 Drawing Sheets

(56) References Cited

OTHER PUBLICATIONS

Watanabe et al., "Jasmine: A Real-time Local-event Detection System based on Geolocation Information Propagated to Microblogs," Article, 2011, pp. 2541-2544, Proceedings of the 20th ACM international conference on Information and knowledge management, ACM New York, NY, USA.

Nguyen et al., "Building earthquake semantic network by mining human activity from Twitter," Conference Publication, 2011, pp. 496-501, 2011 IEEE International Conference on Granular Computing (GIG).

\* cited by examiner

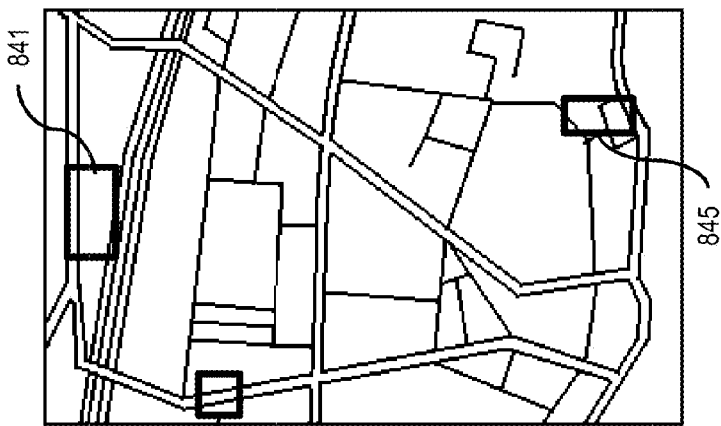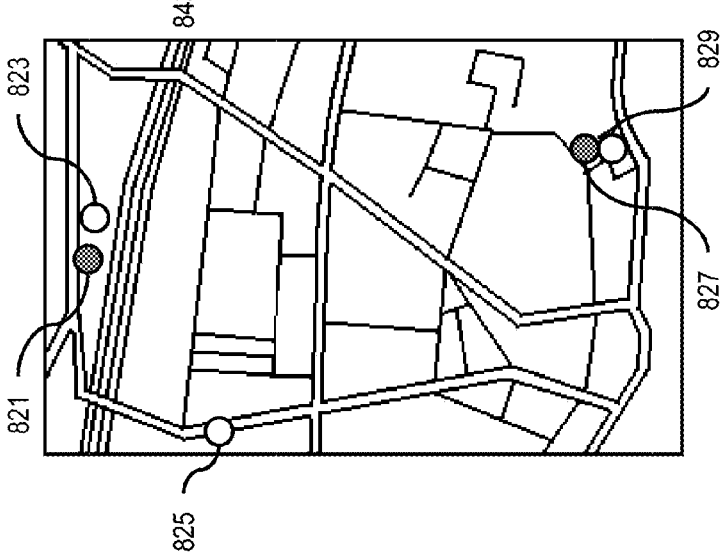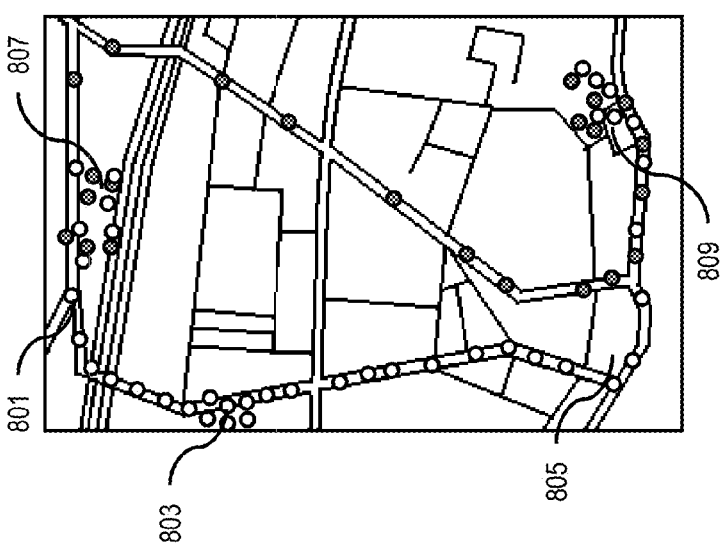

METHOD AND APPARATUS FOR DETECTING POINTS OF INTEREST OR EVENTS BASED ON GEOTAGGED DATA AND GEOLOCATION SEEDS

BACKGROUND

Service providers and device manufacturers (e.g., wireless, cellular, etc.) are continually challenged to deliver value and convenience to consumers by, for example, providing compelling network services. One area of interest has been the creation and maintenance of mapping and location-based services for mobile device users, particularly services that respond to users' increasing expectation and demand for up-to-the-minute information. More specifically, there is an interest in providing users with current information about points of interest (POIs) and other location-based events such as traffic, road construction, new road development, news events, public events, and the like. However, traditional geospatial data collection approaches can be costly or burdensome. Accordingly, service providers and device manufacturers face significant technical challenges to collecting and/or updating geospatial data such as POIs and/or location-based events.

SOME EXAMPLE EMBODIMENTS

Therefore, there is a need for an approach for efficiently generating map and location-based data by, for instance, processing user-generated geotagged data that are selected based on location seeds.

According to one embodiment, a method comprises processing and/or facilitating a processing of location information associated with one or more devices to determine one or more geolocation seeds. The method also comprises causing, at least in part, a querying for content information (e.g., user-generated geotagged data such as social networking posts) based, at least in part, on the one or more geolocation seeds. The method further comprises processing and/or facilitating a processing of the content information to determine one or more points of interest, one or more location-based events, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of location information associated with one or more devices to determine one or more geolocation seeds. The apparatus is also caused to query for content information based, at least in part, on the one or more geolocation seeds. The apparatus is further caused to process and/or facilitate a processing of the content information to determine one or more points of interest, one or more location-based events, or a combination thereof.

According to another embodiment, a computer-readable storage medium carries one or more sequences of one or more instructions which, when executed by one or more processors, cause, at least in part, an apparatus to process and/or facilitate a processing of location information associated with one or more devices to determine one or more geolocation seeds. The apparatus is also caused to query for content information based, at least in part, on the one or more geolocation seeds. The apparatus is further caused to process and/or facilitate a processing of the content information to determine one or more points of interest, one or more location-based events, or a combination thereof.

According to another embodiment, an apparatus comprises means for processing and/or facilitating a processing of location information associated with one or more devices to determine one or more geolocation seeds. The apparatus also comprises means for causing, at least in part, a querying for content information based, at least in part, on the one or more geolocation seeds. The apparatus further comprises means for processing and/or facilitating a processing of the content information to determine one or more points of interest, one or more location-based events, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A-8C depict a process for determining location seeds, according to one embodiment;

DESCRIPTION OF SOME EMBODIMENTS

Examples of a method, apparatus, and computer program for detecting points of interest or events based on geotagged data and geolocation seeds are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
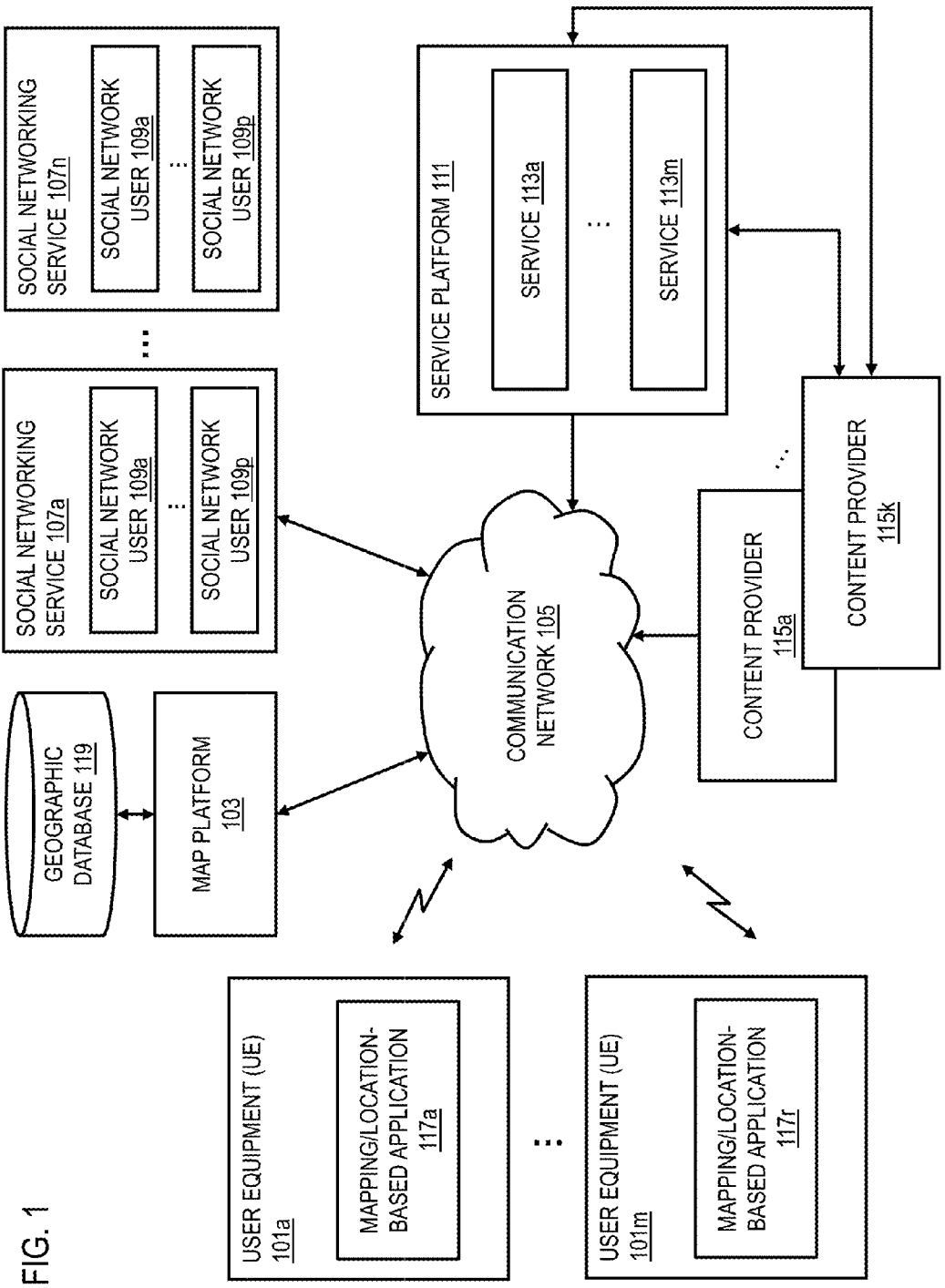
FIG. 1 is a diagram of a system capable of detecting points of interest or events based on geotagged data and geolocation seeds, according to one embodiment.

FIG. 1 is a diagram of a system capable of detecting points of interest or events based on geotagged data and geolocation seeds, according to one embodiment. As previously discussed, service providers and devices manufacturers are interested in developing and improving mapping and location-based services for mobile device users, particularly services that respond to users' increasing demand for up-to-the-minute information. However, the creation and maintenance of mapping and location-based services (e.g., navigation, POI, search, driving and walking recommendations) requires collecting and processing vast amounts of data. For example, POI databases are now continuously updated since the number of new, closed, or updated POIs is ever changing. Similarly, location-based events (e.g., transient events such as traffic, accidents, construction, public gatherings, etc.) are also ever changing. By way of example, to keep up with these changes, field workers may have to manually detect and take note of any potential changes.

Traditional geospatial data collection approaches have included gathering data from driving roads with specially constructed vehicles, municipality and local reporting, satellite imagery, probes, and POI providers. These methods, however, are often costly and restricted by their nature. For example, the traffic data supplied by the municipality or local reporting may no longer be valid after a short period of time. Another emerging source of geospatial information is crowd sourcing, for instance, through direct reporting from participating users (e.g., communities of people that report about defects and updates for maps and POIs), or data mining user generated geotagged content information (e.g., social networking communications or posts). However, accurate crowd sourcing requires substantial intentional and devoted activity on the part of the crowd or community, which can probably only be expected from a small portion of the population. In addition, because of the vast volume of user generated content, the resources required for bulk processing of such content information can be burdensome and/or result in less frequent updates to the POIs and/or location-based events.

To address this problem, a system 100 of FIG. 1 introduces the capability to automatically detect new or updated POIs or location-based events by using a combination of mobile device positioning and geotagged user generated content (e.g., Internet or social networking postings). More specifically, the system 100 uses location information emitted by mobile devices to identify geographical regions where the mobile devices may be concentrated. These regions are then designated as location seeds and searched for geotagged user generated content information. In one embodiment, content information pertaining to POIs or other location-based events at the location seeds (e.g., locations where there are concentrations of the mobile devices) are tagged as containing POIs and/or events.

In one embodiment, the POIs and/or events can be designated as candidate items. The system 100 can then verify the candidate items before officially designating them as POIs or events. By way of example, the system 100 may perform the verification of the candidate items using manual means (e.g., generating a list of the candidate items for manual verification by field workers) or additional processing (e.g., conducting searches of directories or other information stores to verify the details of the candidate POIs or events).

In one embodiment, the location information associated with the mobile device can be determined from probe data. Probe data, for instance, can include geolocation information (e.g., geographic coordinates, heading, speed, etc.) recorded by the mobile devices and transmitted to the system 100. In some cases, the probe data is collected from mobile devices that have agreed to or opted into the probe data collection program. In some embodiments, the system 100 can obtain the location information via other means such as network triangulation or usage. For example, the system 100 can determine the number of devices connected to a WiFi network with a known location or the number of devices in a communication cell of a cellular network. It is contemplated that the system 100 may use any means or metric to determine the number or density of mobile devices at various locations for processing according to the various embodiments described herein.

In one embodiment, the system 100 can refine the determination of the location seeds by applying additional criteria. For example, the system 100 can determine the location seeds based on a number of unique mobile devices concentrated at a particular location rather than just a device count in general to reduce the potential to count the same device multiple times. In another embodiment, the system 100 may determine the location seeds based, at least in part, on how long the mobile devices linger or stay at a particular location. The criteria for the length of the stay can be varied to balance between distinguishing between a device's actual stay points versus merely passing or transiting through the point. In another embodiment, the location information and/or location seeds may be based on real-time, substantially real-time, and/or historical information. In yet another embodiment, the system 100 may determine whether the location seeds are contextually relevant to POIs or events. For example, if devices cluster at a particular location seed near dinner time, the system 100 may infer that the location seed may be associated with a food-related POI or event.

In one embodiment, the user generated content information can include postings or communications exchanged within one or more social networks (e.g., FACEBOOK, TWITTER, YOUTUBE, etc.). This content information can then be parsed or mined to determine whether they are related to or mention specific POIs or events. The POI or event related information can then be used to discover new POIs or events, or to update existing POIs or events. Research suggests that the number of users and the time spent exchanging communications within one or more social networks has already reached the volume of email communication and probably will be surpassing it in the near future. As a result, the communications exchanged within one or more social networks can provide a fertile ground for information processing (e.g., collection, extraction, storage, and analysis) and data mining (e.g., automatic or semi-automatic analysis of large quantities of data to extract previously unknown interesting patterns).

In one embodiment, the system 100 re-purposes commercially available tools developed for monitoring and analyzing various social networks for marketing, promotions, and customer services purposes in order to determine geospatial and location-based data. In one example, the processing of content information for location-based information by the system 100 is based on a linguistic analysis of the information (e.g., map, traffic, POI, event, location-based or location related keywords and phrases). After the content information is queried based on determined location seeds, the system 100 mines the information to determine potential POIs or events. For example, the system 100 correlates the map-related information from among one or more social networks, binds the map-related information to one or more map elements, filters the map-related information, based at least in part, on one or more noise filters, classifies the map-related information based, at least in part, on the granularity of the data, or a combination thereof. Further, the system 100 also subjects the extracted data to a number of threshold criteria to better ensure its accuracy including a correctness probability, a level of confidence, a degree of trust, an author's influence, a rating, or a combination thereof before the candidate data items are propagated to one or more mapping and/or location-based services. In one embodiment, the resulting POI or event data are propagated to mapping and/or location-based services that in turn make the data available to users of mobile devices (e.g., mobile phones) through one or more mobile mapping/location-based applications.

As shown in FIG. 1, the system 100 comprises one or more user equipment (UE) 101a-101m (also collectively referred to as UEs 101) having connectivity to a map platform 103, one or more social network services 107a-107n (also collectively referred to as social network services 107) consisting of one or more social network users 109a-109p (also collectively referred to as social network users 109) via a communication network 105. The UEs 101 also have connectivity to a service platform 111 that includes one or more services 113a-113m (also collectivity referred to as services 113) for providing mapping and/or location-based services. In one embodiment, the service platform 111 and/or services 113 interact with one or more content providers 115a-115k (also collectively referred to as content providers 115) to provide mapping information or user generated content information to the map platform 103. In one embodiment, the UEs 101 contain one or more mapping/location-based applications 117a-117r (also collectively referred to as mapping/location-based applications 117). The mapping/location-based applications 117 enable the UEs 101 to access the POI or event information determined by the system 100 and subsequently provisioned by the mapping/location services 113. In one embodiment, the map platform 103 performs the functions of detecting POIs or events as discussed with respect to the various embodiments described herein. By way of example, the map platform 103map platform 103 may exist independently or within a cloud computing and/or cloud storage platform. Further, in one example, a social network user 109 may use a UE 101 in order to both communicate map-related information within the social network services 107 as well as receive the POI or event data generated by the map platform 103 and stored in the geographic database 119.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the UEs 101, the map platform 103, the social network services 107, and the services 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the mapping/location-based applications 117, the map platform 103, the social network services 107, the service 111 platform, and/or the services 113 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates.

As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
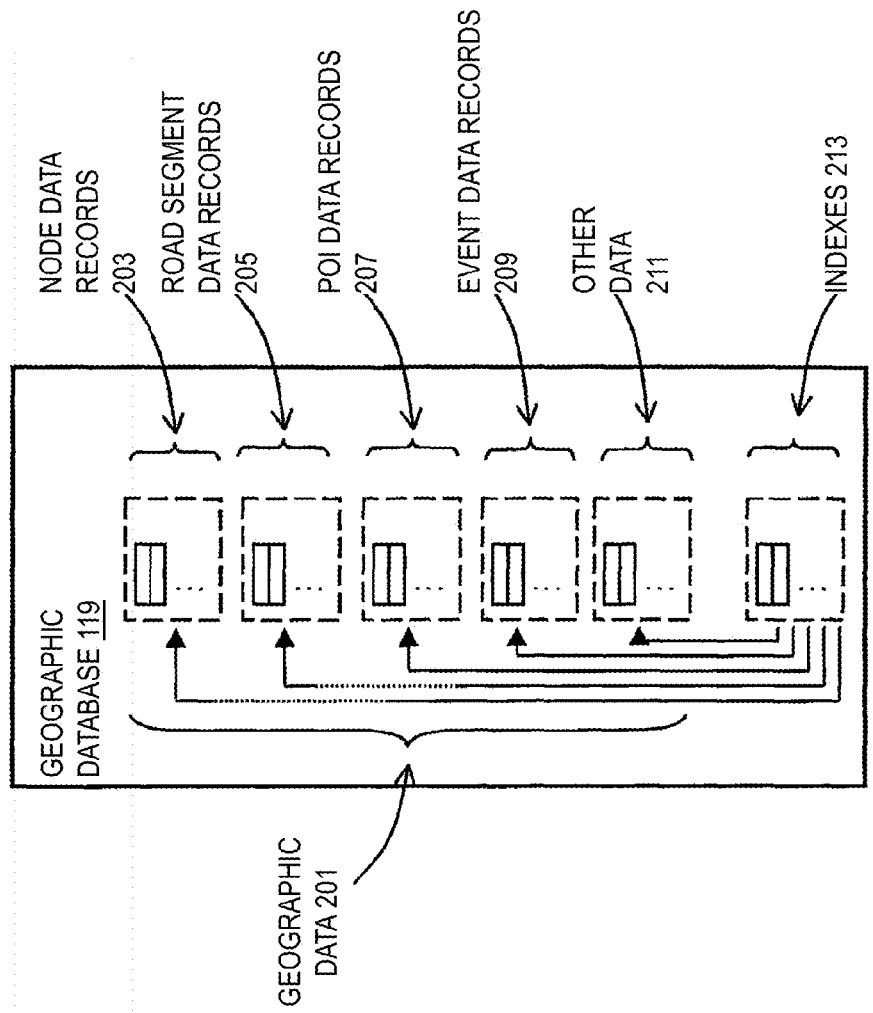
FIG. 2 is a diagram of a geographic database, according to one embodiment.

FIG. 2 is a diagram of a geographic database, according to one embodiment. In one embodiment, the generated POI or event data may be stored, associated with, and/or linked to the geographic database 119 or data thereof. In one embodiment, the geographic or map database 119 includes geographic data 201 used for (or configured to be compiled to be used for) navigation-related services. For example, the geographic database 119 includes node data records 203, road segment or link data records 205, POI data records 207, event data records 209, and other data records 211. More, fewer, or different data records may be provided. In one embodiment, the other data records 211 include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI or event data may be matched with respective map or geographic records via position or GPS data associations (such as using known or future map matching or geo-coding techniques).

In one embodiment, the road segment data records 205 are links or segments representing roads, streets, or paths. The node data records 203 are end points corresponding to the respective links or segments of the road segment data records 205. The road link data records 205 and the node data records 203 represent a road network, such as used by vehicles, cars, and/or other entities. Alternatively, the geographic database 119 contains path segment and node data records or other data that represent pedestrian paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 may include data about the POIs and their respective locations in the POI data records 207. The geographic database 119 may also include data about places, such as cities, towns, or other communities, and other geographic features, such as bodies of water, mountain ranges, etc. Such place or feature data may be part of the POI data 207 or may be associated with POIs or POI data 207 (such as a data point used for displaying or representing a position of a city). In addition, the geographic database 119 may include data about location-based events and their respective locations in the event data records 207. By way of example, the location-based events include any type of event that is associated with a particular location including, for instance, traffic, accidents, construction, public gatherings, etc.

The geographic database 119 may be maintained by the content provider 115 (e.g., a map developer). The map developer 115 collects geographic data to generate and enhance the database 119. There are different ways used by the map developer 115 to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used.

The geographic database 119 may be a master geographic database stored in a format that facilitates updating, maintenance, and development. For example, the master geographic database 119 or data in the master geographic database 119 is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 119 may be a master geographic database, but in alternate embodiments, the database may represent a compiled navigation database that may be used in or with end user devices (e.g., UEs 101) to provided navigation-related functions. For example, the database 119 may be used with the end user device 101 to provide an end user with navigation features. In such a case, the database may be downloaded or stored on the end user device 101, or the end user device 101 may access the database 119 through a wireless or wired connection (such as via a server and/or network 105).

In one embodiment, the end user device or UE 101 is an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the navigation device 101 is a cellular telephone. An end user may use the device 101 for navigation functions such as guidance and map display.

Figure 3:
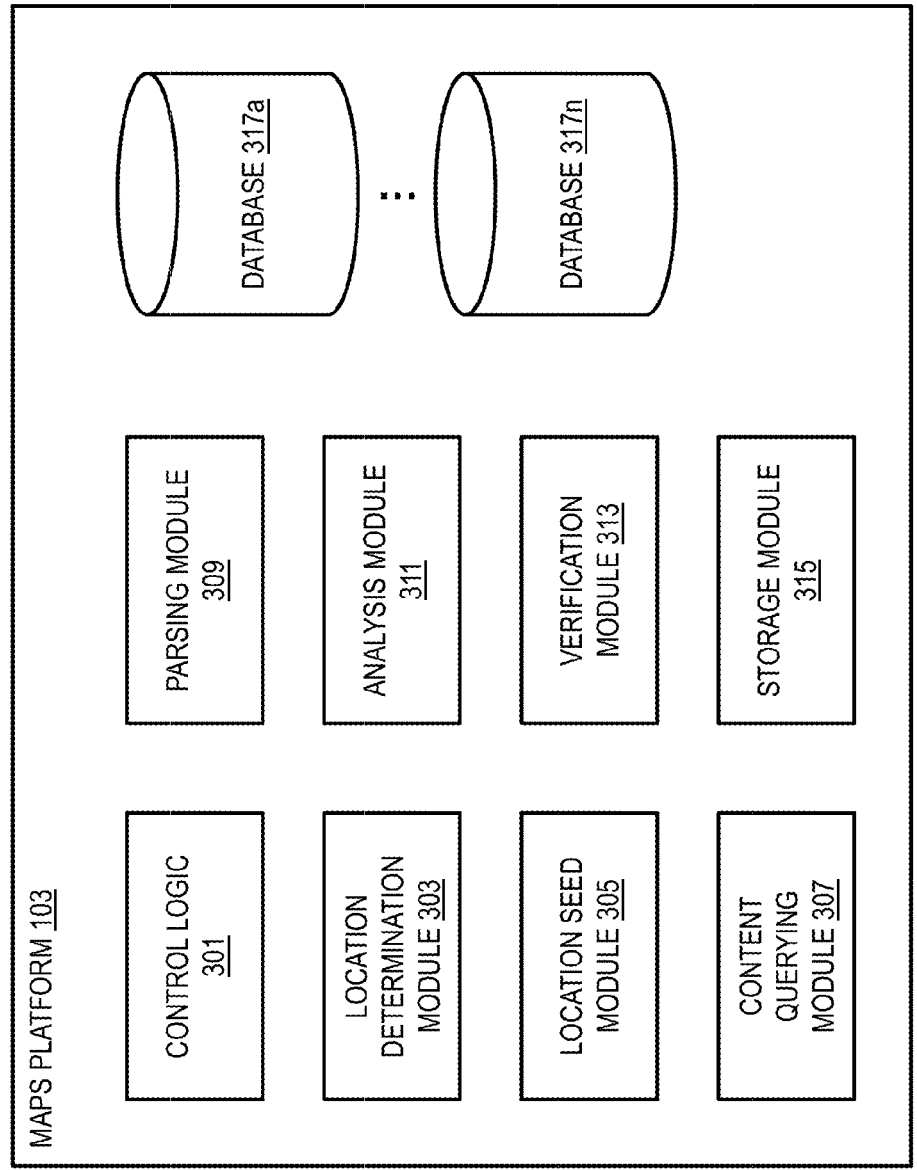
FIG. 3 is a diagram of components of a map platform, according to one embodiment.

FIG. 3 is a diagram of components of a map platform, according to one embodiment. By way of example, the map platform 103map platform 103 includes one or more components for detecting POIs or events based on geotagged data and geolocation seeds. It is contemplated that the functions of these components may be combined in one or more components or performed by other components of equivalent functionality. In this embodiment, the map platform 103 includes a control logic 301, a location determination module 303, a location seed module 305, a content querying module 307, a parsing module 309, an analysis module 311, a verification module 313, a storage module 315, and one or more databases 317a-317n (also collectively referred as the databases 317).

The control logic 301 interacts with the location determination module 303 to determine location information or location points associated with one or more UEs 101. In one embodiment, the location determination module 303 applies a deterministic asynchronous finite state detection algorithm to location-based data (e.g., probe data), including but not limited to data of Cell-ID, GPS, accelerometer, W-LAN, etc., to determine location points or information for the UEs 101. In one embodiment, the location determination module 303 outputs continuous or periodic data concerning the location points of the UEs 101. In addition or alternatively, the location determination module 303 may determine historical or previously recorded location information for the UEs 101.

This location point data is fed to a location seed module 305, whose task is to recognize relevant locations determined from the location information of a group of UEs 101. For example, when the location point data indicates that a relatively large number of the UEs 101 are located within a relatively small distance from one another, and within a relatively short time interval, a location seed or candidate location seed is determined or formed. As previously described the location seed can also be based on other criteria including whether the location points are from unique UEs 101 or if location seed points are contextually relevant to a particular POI or event.

In one embodiment, the location seed can be defined by a center point of the location of a set of clustered UEs 101. In another embodiment, the shape of the location seed varies as a function of the geographic spread of the geo-coordinate (e.g., GPS) readings or according to a predetermined radius. By way of example, each location seed can be associated with any of the following attributes: (a) geographic dimensions (geo-coordinates of the center point, shape, radius, etc.), (b) probability distribution across times of a day when the UEs 101 are typically detected at that location or place, (c) probability distribution across days of a week/month/year when the UEs 101 are typically detected in that location or place, and/or (d) history (cumulative times of staying in the place as well as records of incidents when the UEs 101 have been detected within that particular location or place).

In one embodiment, the location seed module 305 discovers stay points from the location points, and then estimates location seeds form the stay points. By way of example, for each time period for the UEs 101, the location seed module 305 retrieves a list of location points lp=(p1, p2, . . . , pN), where N is the number of location points for the UEs 101. In one embodiment, a location point pi is defined using a 3-tuple: pi=(lat, long, T) corresponding to latitude, longitude, and timestamp. In an alternative implementation, a heading h and/or speed s are included to define pi as: (lat, long, h, s, T).

By way of example, the location seed module 305 determines a list of stay points lsp =(sp1, sp2, . . . , spM) from location points by using the list of consecutive location points 1p of a day for the UEs 101. M is the number of resulting stay points. Each stay point spj is defined using a 4-tuple: spj=(lat, long, Tstart, Tend) corresponding to the location and time when the stay point started and ended. In one embodiment, a stay point, extending from location point ps to location point pe exists, when the two following conventional constraints are fulfilled:

SpaceDistance (ps, pe)<Dmax,
TimeDifference(ps, pe)>Tmin,

In one embodiment, Dmax and Tmin are two tuning parameters. Dmax is the maximum distance that the user can cover in a place to be considered as a stay point. Tmin is the minimum time that the user must be within the same place to be considered as a stay point. For instance, Dmax is 250 meters and Tmin is 50 minutes, respectively.

In another embodiment, the constraint Tmax for extracting stay points is introduced to limit a time difference between two consecutive location points (e.g., 10 minutes). In other words, all the consecutive location points belonging to a stay point must be close in time. Thereafter, in one embodiment, the location seed module 305 uses a clustering algorithm (e.g., a density-based method, a grid-based method, etc.) to estimate location seeds or stay regions from stay points.

After determining the location seeds, the location seed module 305 interacts with the content querying module 307 to determine content information associated with location seeds. The content information, for instance, includes geotagged user generated content including social networking communications or posts. In one embodiment, the content querying module 307 constructs a location based query specifying the location seeds as a parameter for obtaining resulting content information. In one embodiment, the query may specify the location seed as a point and an associated radius from the point defining a circular boundary. In addition or alternatively, the location seed may be bounded as described above based on the extent of the distribution of the stay points of the individual UEs 101.

Next the parsing module processes the identified content information to identify references to POIs or location-based events. In one embodiment, the parsing module 309 comprises one or more commercially available tools developed for monitoring and analyzing various social networks for marketing, promotions, and customer services purposes (e.g., RADIAN6, KANA, VISIBLE, etc.). As previously discussed, the one or more commercially available monitoring and analysis tools are re-purposed to process the one or more communications postings within the social network services 107 to determine POI or event related information. More specifically, in one example, the initial parsing of the communications by the parsing module 309 is based on a linguistic analysis of the data (e.g., map, traffic, POI, location-based and location related keywords and phrases). For example, one or more communications within the social network services 107 related to Boston, I-95, and car accidents may be processed by the parsing module 309, but one or more communications related to non-location based entertainment or politics may not. Based on the parsing, the parsing module 309 collates the content information containing references to POIs or events.

The analysis module 311 is used to extract POI or event related information from the collated content information determined by the parsing module 305 to identify potential POIs or events associated with the corresponding location seeds. More specifically, the analysis module 311 determines patterns among the related information by (a) correlating or binding the information to one or more map elements or locations; (b) filtering the information, based at least in part, on one or more noise filters; (c) classifying the information, based at least in part, on the granularity of the data, or a combination thereof.

Further, in one embodiment, the analysis module 311 interacts with the verification module 313 to subject the extracted data to a number of threshold criteria stored within the databases 317 including a correctness probability, a level of confidence, a degree of trust, a rating, or a combination thereof. Once the candidate data reaches one or more threshold criteria, the data is considered accurate and valid and can then be propagated to the mapping/location-based services 113. In addition or alternatively, the verification module 311 may provide a list of candidate POIs or events for manual verification.

The storage module 315 is then used to store the POI or event related information found within the social network services 107 or other content provider in the databases 317a-317n. In one embodiment, the storage module 315 is also used to provide secondary filtering and classification of the POI or event information.

Figure 4:
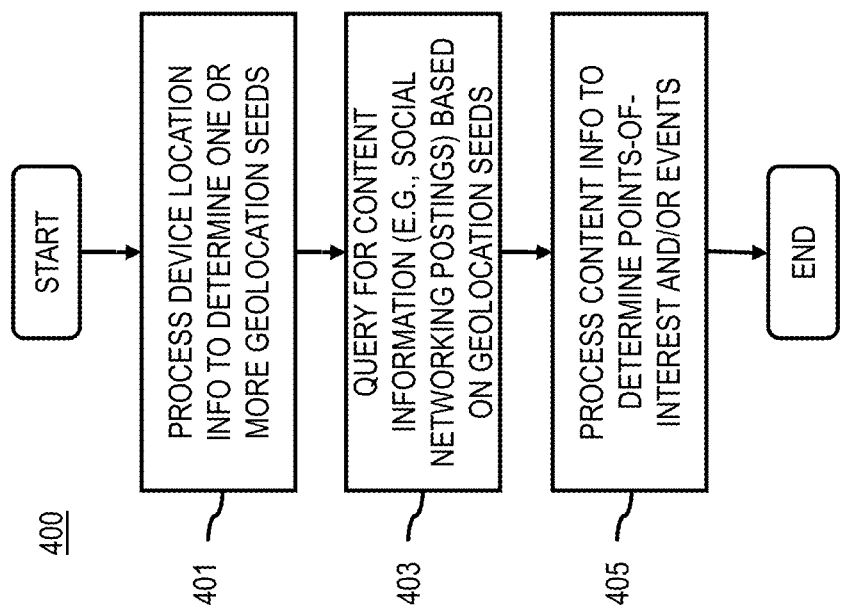
FIG. 4 is a flowchart of a process for detecting points of interest or events based on geotagged data and geolocation seeds, according to one embodiment.
Figure 12:
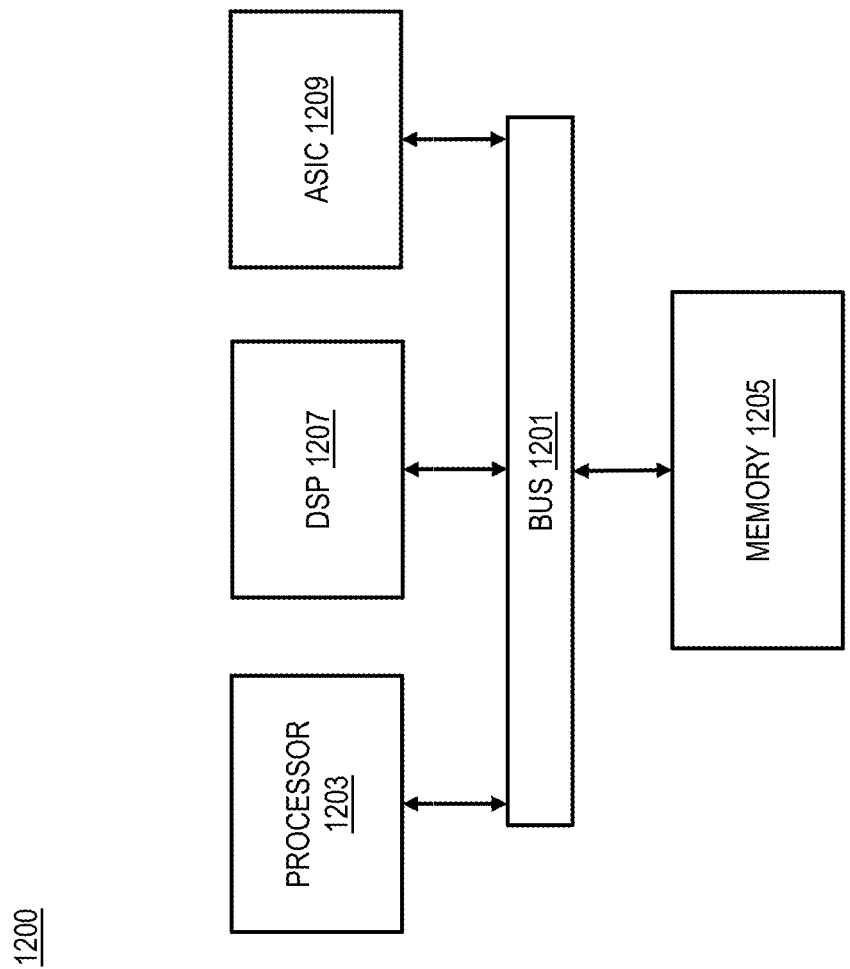
FIG. 12 is a diagram of a chip set that can be used to implement an embodiment of the invention.

FIG. 4 is a flowchart of a process for detecting points of interest or events based on geotagged data and geolocation seeds, according to one embodiment. In one embodiment, the map platform 103 performs the process 400 and is implemented in, for instance, a chip set including a processor and a memory as shown in FIG. 12.

In step 401, the map platform 103 processes and/or facilitates a processing of location information associated with one or more devices to determine one or more geolocation seeds. In one embodiment, the location information includes, at least in part, substantially real-time information, historical information, or a combination thereof.

The map platform 103 then causes, at least in part, a querying for content information based, at least in part, on the one or more geolocation seeds (step 403). In one embodiment, the content information includes, at least in part, geotagged user postings (e.g., social networking communications or postings). For example, the content information can include communications created by one or more social network users for the purpose of exchanging user generated content (e.g., posts, blogs, comments, etc.) within the various social networks (e.g., FACEBOOK, TWITTER, YOUTUBE, etc.). In one embodiment, the map platform 103 determines at least one search radius with respect to the one or more locations seeds. The querying for the content information is based, at least in part, on the at least one search radius. As previously discussed, the map platform 103 may also define the location seeds with an associated boundary. In this case, the maps platform 103 can use the associated boundary in place of the radius in its location-based query for relevant content information.

In step 405, the map platform 103 processes and/or facilitates a processing of the content information to determine one or more points of interest, one or more location-based events, or a combination thereof. In one embodiment, the map platform 103 determines the location information, the one or more location seeds, the content information, the one or more points of interest, the one or more location-based events, or a combination thereof in substantially real-time, periodically, according to a schedule, on demand, or a combination thereof.

Figure 5:
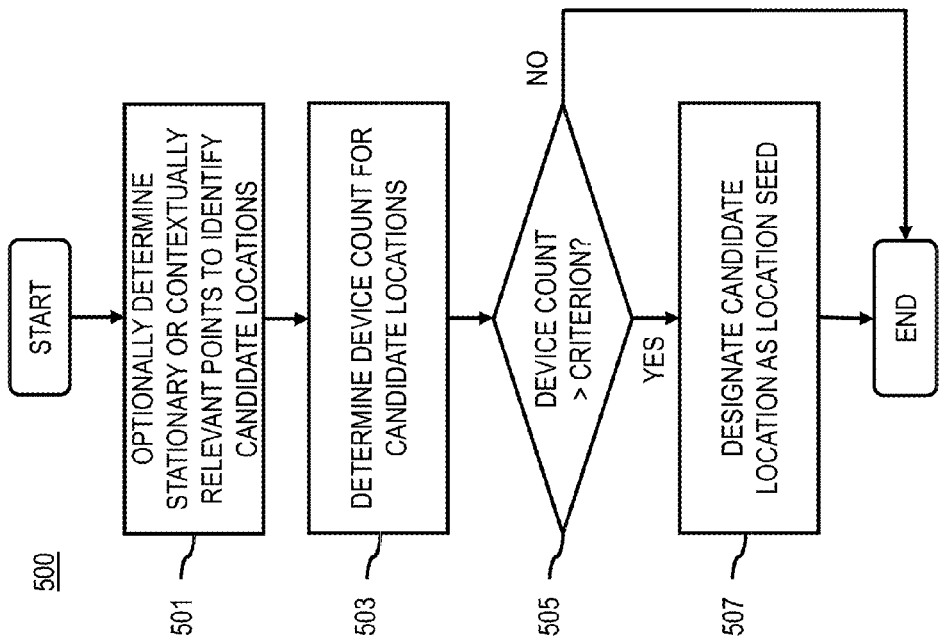
FIG. 5 is a flowchart of a process for determining geolocation seeds, according to one embodiment.

FIG. 5 is a flowchart of a process for determining geolocation seeds, according to one embodiment. In one embodiment, the map platform 103 performs the process 500 and is implemented in, for instance, a chip set including a processor and a memory as shown in FIG. 12.

In step 501, the map platform 103 optionally processes and/or facilitates a processing of the location information to determine one or more stationary points, one or more contextually relevant points, or a combination thereof associated with the one or more devices.

In step 503, the map platform 103 processes and/or facilitates a processing of the location information associated with the one or more devices to determine a count of the one or more devices associated with one or more candidate locations. In one embodiment, the map platform 103 determines the count based, at least in part, on a uniqueness of the one or more devices. In another embodiment, the one or more candidate locations are also based, at least in part, on the one or more stationary points, the one or more contextually relevant points, or a combination thereof.

If the device count is above a predetermined criterion or threshold value (step 505), the map platform 103 causes, at least in part, a designation of the one or more candidate locations as the one or more location seeds based, at least in part, on a comparison of the count against a threshold count criterion (step 507).

Figure 6:
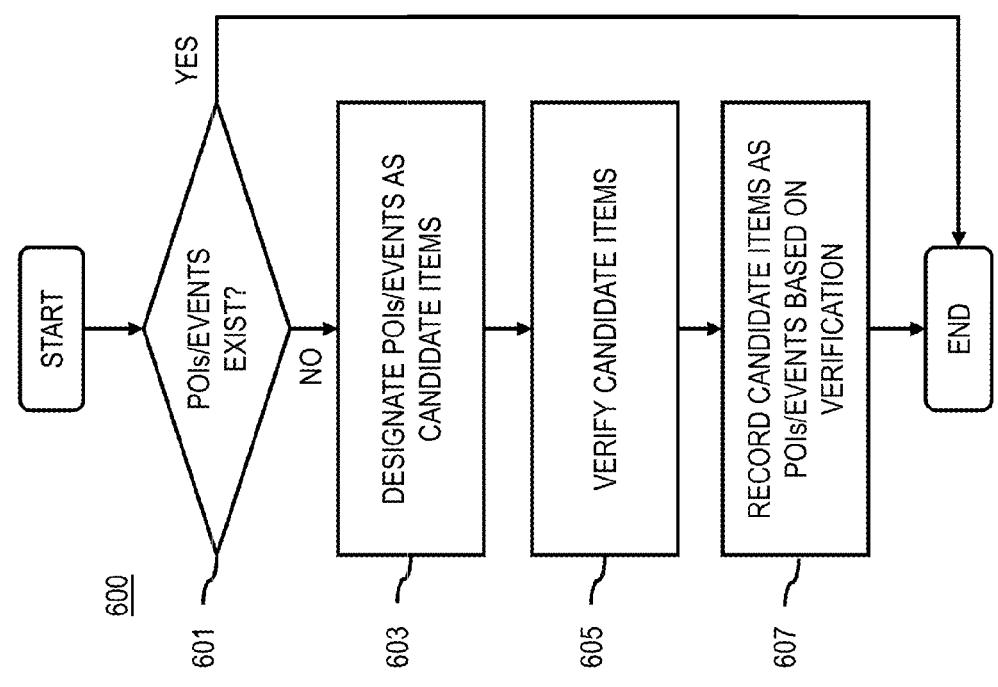
FIG. 6 is a flowchart of a process for verifying detected points of interest or events, according to one embodiment.

FIG. 6 is a flowchart of a process for verifying detected points of interest or events, according to one embodiment. In one embodiment, the map platform 103 performs the process 600 and is implemented in, for instance, a chip set including a processor and a memory as shown in FIG. 12.

In step 601, the map platform 103 determines whether the POIs or events identified from the content information already exists in one or more databases or data stores. If the map platform 103 determines that the one or more points of interest, the one or more location-based events, or a combination are not previously included in at least one location-based data store, the map platform 103 causes, at least in part, a designation of the one or more points of interest, the one or more location-based events, or a combination as one or more candidate items.

In step 605, the map platform 103 causes, at least in part, a verification of the one or more candidate items. In step 607, the map platform 103 causes, at least in part, a storage or recording of the one or more candidate items in at least one data store based, at least in part, on the verification (step 607).

Figure 7:
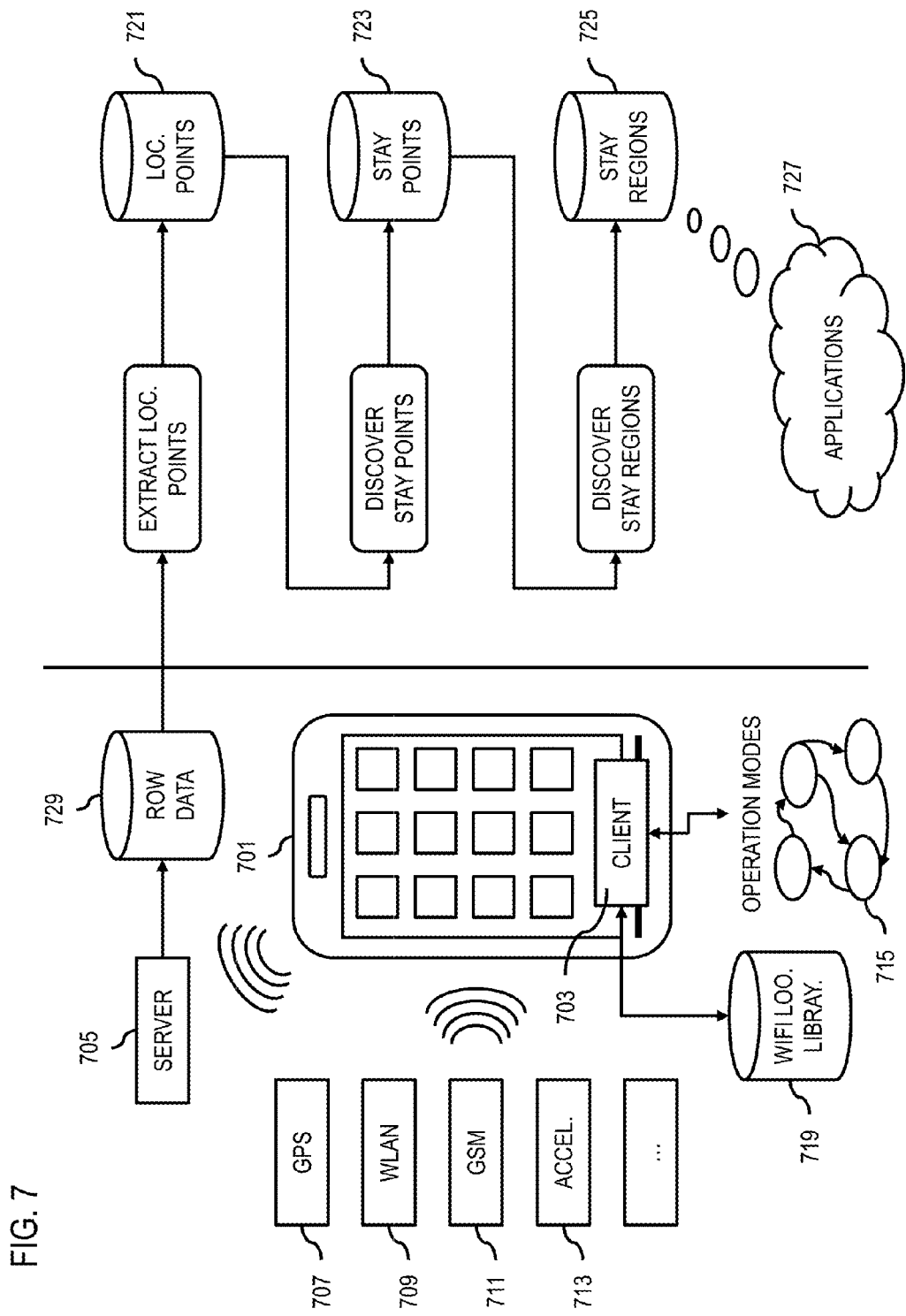
FIG. 7 is a data flow diagram for an approach of determining a geographical area contextually relevant to a user, according to one embodiment.

FIG. 7 is a data flow diagram for an approach of determining a geographical area contextually relevant to a user, according to one embodiment. In one embodiment, determining location seeds depends on data that are obtained from one or more sensors (e.g., GPS, accelerometer, etc.). The sensors may be associated with the UEs 101 (e.g., smart phone, PDA, etc.) being monitored. As shown in the example of FIG. 7, a UE 701 (e.g., a smart phone) is used to collect location data. In one embodiment, location data has been collected using a client-server system. The client 703 residing in the UE 701 records location data from a global positioning system (GPS) 707, a wireless local area network (WLAN) 709 (e.g., connected via WiFi, Bluetooth, infrared, etc.), a global system for mobile communications (GSM) 711, an accelerometer (ACCEL) 713, etc.

In one embodiment, the UE 701 continuously samples the context information from the plurality geographic location identification sources including GPS, A-GPS, accelerometer, network based position system WLAN scanning, or a combination thereof, and determines a current state of the UE 701 as searching, GPS fix, or stationary, thereby determining a location point. Therefore, as the UE 701 switches among different modes/states 715, the location data is collected and recorded into a location library 719 available locally at the UE 701. In another embodiment, the context and/or location information can be determined on demand or as needed by the various embodiments of the approach described herein and reported to the map platform 103.

In another embodiment, the server 705 (e.g., the map platform 103) extracts location points from a raw location database 719 based upon a state determining approach (e.g., a location state) or other methods, and saves the location points into a location point database 721. The server 705 then discovers stay points from the location points and saves the stay points into a stay point database 723. In one embodiment, the UE 701 has to remain within a predetermined boundary of a candidate stay point for a minimum period of time for the candidate stay point to be designated as a stay point. Accordingly, in one embodiment, the size or boundary of the region and the minimum period of time are two parameters associated with determining the stay point. In some embodiments, an additional parameter is introduced, which limits a time difference between two consecutive location points, to ensure all the consecutive location points included in a stay point are close in time. Thereafter, the server 705 estimates stay regions (e.g., location seeds) from the stay points and saves the stay regions into a stay region database 725. In one embodiment, a clustering algorithm (e.g., a density-based method, a grid-based method, etc.) is used to estimate stay regions from stay points. Calculations concerning stay points and location seeds are made either locally at the UE 701 or externally at the server 705 (e.g., the map platform 103).

FIGS. 8A-8C depict a process for determining location seeds, according to one embodiment. In one embodiment, location points, stay points, and location seeds can be displayed in a location user interface panel. For example, in FIG. 8A, location points 801, 803, 805, 807, 809, etc., were extracted for UEs 101 visiting a geographic region depicted in the map. In this example, the location points correspond to the paths traveled by different UEs 101. By way of example, these location points are associated with different coordinates, heading, speed, stay times, etc.

FIG. 8B shows the stay points 821, 823, 825, 825, and 829 using the location points in FIG. 8A as input data. In this example, the UEs 101 have stayed in the areas associated with points 821 and 823; points 827 and 829, and point 825. In one embodiment, the stay points are determined based on whether the UEs 101 have clustered at particular locations in sufficient number for greater than a predetermined period of time. As previously described, the stay points or associated device counts can be based on unique devices. In this scenario, the resulting stay points are grouped based on proximity and device count. For example, as shown in FIG. 8C, three location seeds are determined from the stay points of FIG. 8B: location seed 841 based on stay points 821 and 823, location seed 843 based on stay point 825, and location seed 845 based on stay points 827 and 829. The location seeds 841, 843, and 845 can then be used by the map platform 103 to query or filter content information associated with or originating from the locations for processing to detect POIs or events.

Figure 9:
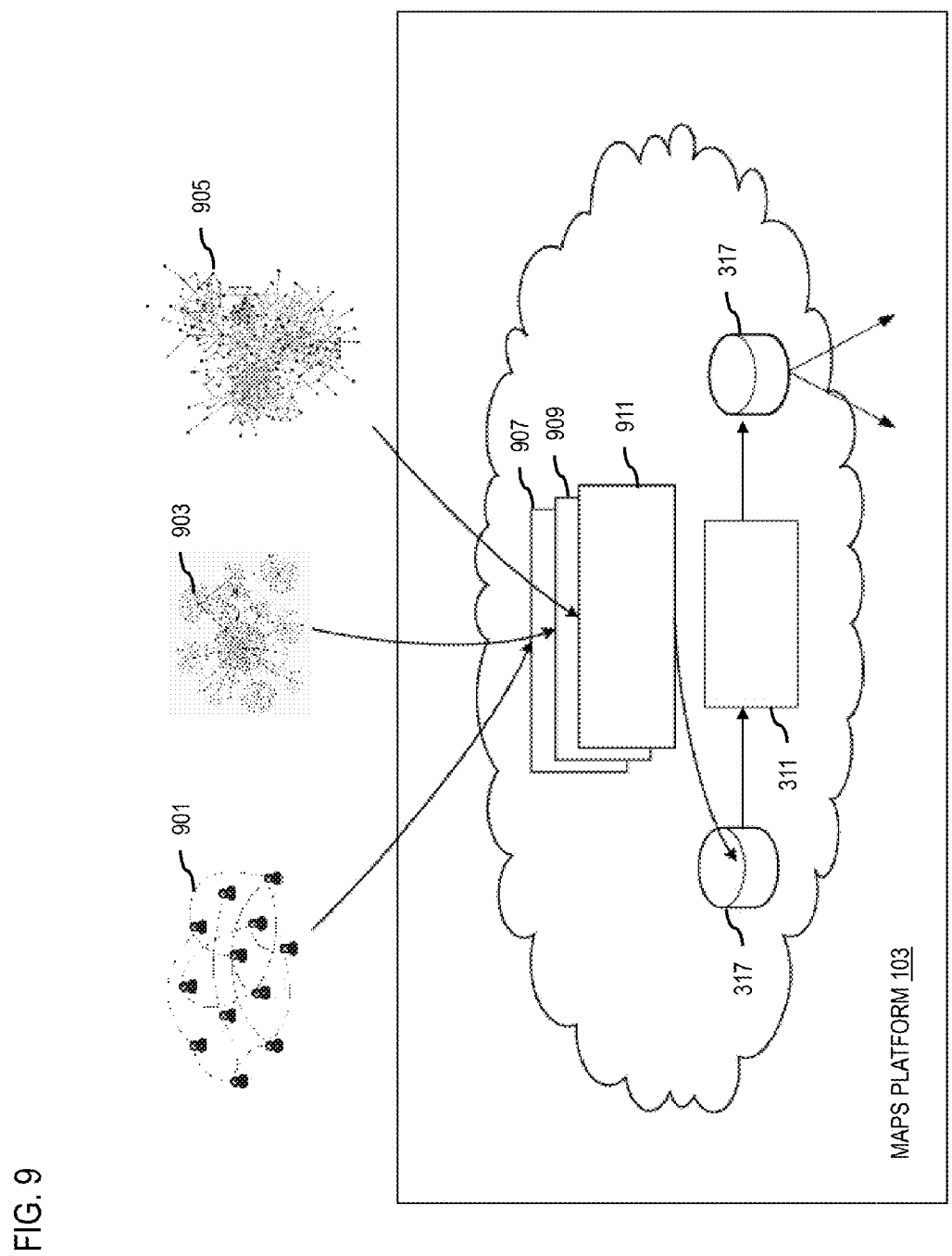
FIG. 9 is a data flow for an approach for processing content information to determine points of interest or events, according to one embodiment.

FIG. 9 is a data flow for an approach for processing content information (e.g., social networking information) to determine points of interest or events, according to one embodiment. Although FIG. 9 is discussed with processing social networking information as a form of content information, it is contemplated that any other form of geotagged user-generated data may be used with the various embodiments described herein. As shown, FIG. 9 illustrates an embodiment of the data flow of one or more data items from one or more communications or postings exchanged within one or more social networks (e.g., social networks 901, 903, and 905).

For example, one or more communications are initially selected based on the location seeds as determined above and processed by one or more social network monitoring and analysis tools (e.g., social network monitoring and analysis tools 907, 909, and 911) to determine POI or event related information. The selected communications are then stored in the databases 317, where they are further filtered and classified. Thereafter, the analysis module 311 extracts, processes, and mines the stored communications to determine POI or event related information. In addition, the analysis module 311 subjects the POI or event information to a number of threshold criteria to better ensure its accuracy or verification before again storing the POI or event information in the databases 317. Once the map platform 103 determines or otherwise verifies the accuracy of the POI or event information, the map platform 103 can then propagate the information to one or more mapping/location-based services.

Figure 10:
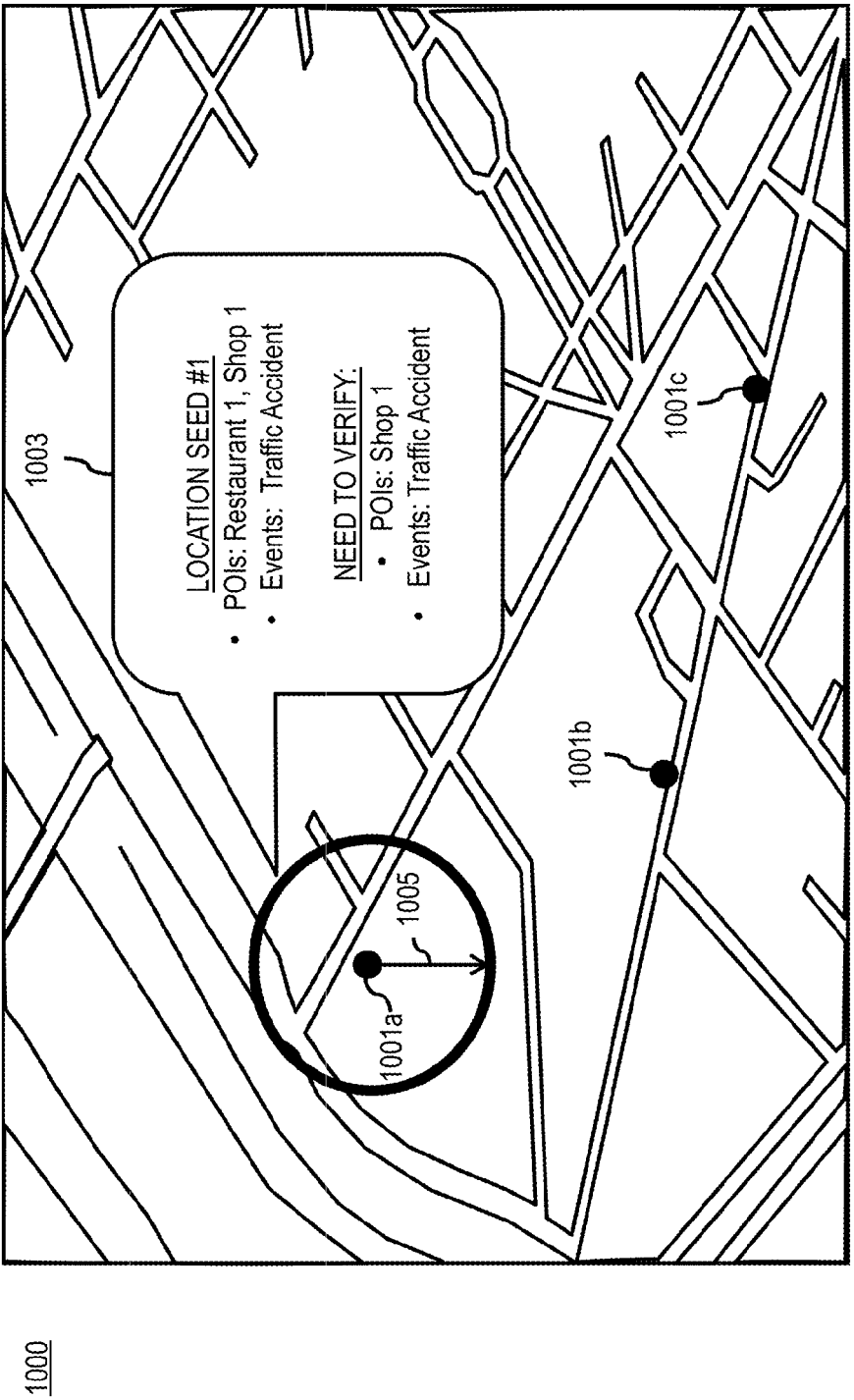
FIG. 10 is a diagram of a user interface used in the processes of FIGS. 1-9, according to one embodiment.

FIG. 10 is a diagram of a user interface used in the processes of FIGS. 1-9, according to one embodiment. FIG. 10 depicts a user interface 1000 presenting a map with three location seeds 1001a-1001c indicated at their respective locations. In this example, the location seeds 1001a-1001c represent locations of with a sufficient number or density of UEs 101 that have lingered at the locations for a sufficient period of time. The lingering time, for instance, is indicative of a possible place of interest (e.g., a POI or other location-based event) that attracts users to stay.

As shown, the user has selected location seed 1001a to view a popup window 1003 that shows all POIs (e.g., Restaurant 1 and Shop 1) and events (e.g., a traffic accident) that have been determined to be associated with the location seed 1001a. The POIs and events, for instance, are determined by analyzing user postings associated with the location seed 1001a. In one embodiment, the system 100 specifies a predetermined radius 1005 around the location seed 1001a, and queries for all user postings originating from or concerning bounded by the circular area formed by the radius 1005. In one embodiment, multiple postings about the same POI or event within the radius 1005 can be collated, for instance, to avoid duplication.

In this example, the popup window 1003 also identifies the POIs or events that need verification (e.g., Shop 1, Traffic Accident). In one embodiment, the POIs or events are designated as needing verification if they are not listed or verified in one or more location databases. In some embodiments, the map platform 103 can display only those POIs or events that are missing from major search engines and/or the location databases to highlight potentially new or updated information. These POIs or events can then be verified using automated and/or manual means.

The processes described herein for detecting points of interest or events based on geotagged data and geolocation seeds may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
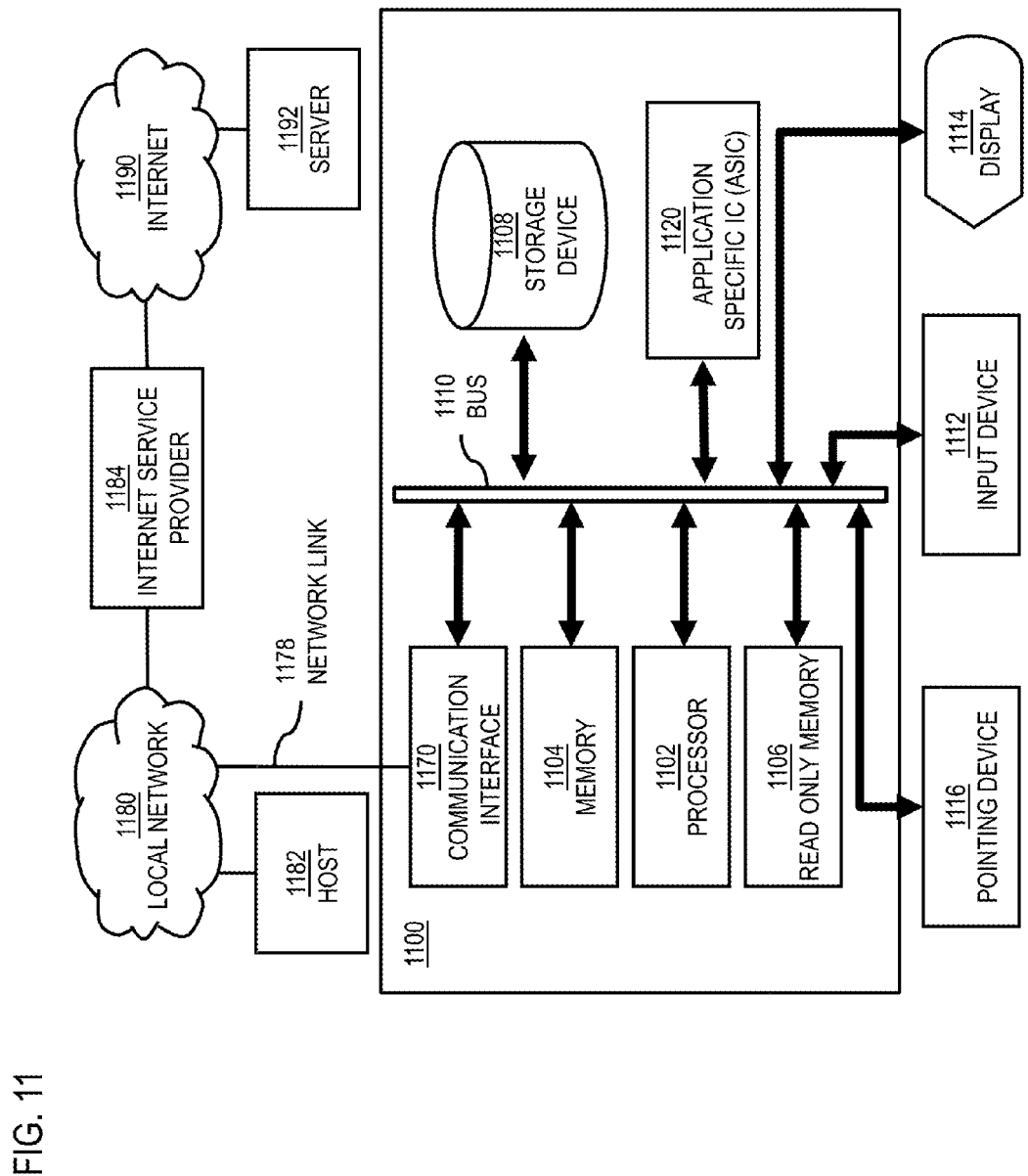
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to detect points of interest or events based on geotagged data and geolocation seeds as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of detecting points of interest or events based on geotagged data and geolocation seeds.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to detecting points of interest or events based on geotagged data and geolocation seeds. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for detecting points of interest or events based on geotagged data and geolocation seeds. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost.

Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for detecting points of interest or events based on geotagged data and geolocation seeds, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for detecting points of interest or events based on geotagged data and geolocation seeds.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to detect points of interest or events based on geotagged data and geolocation seeds as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of detecting points of interest or events based on geotagged data and geolocation seeds.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to perform specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to detect points of interest or events based on geotagged data and geolocation seeds. The memory 1205 also stores the data associated with or generated by the execution of the inventive steps.

Figure 13:
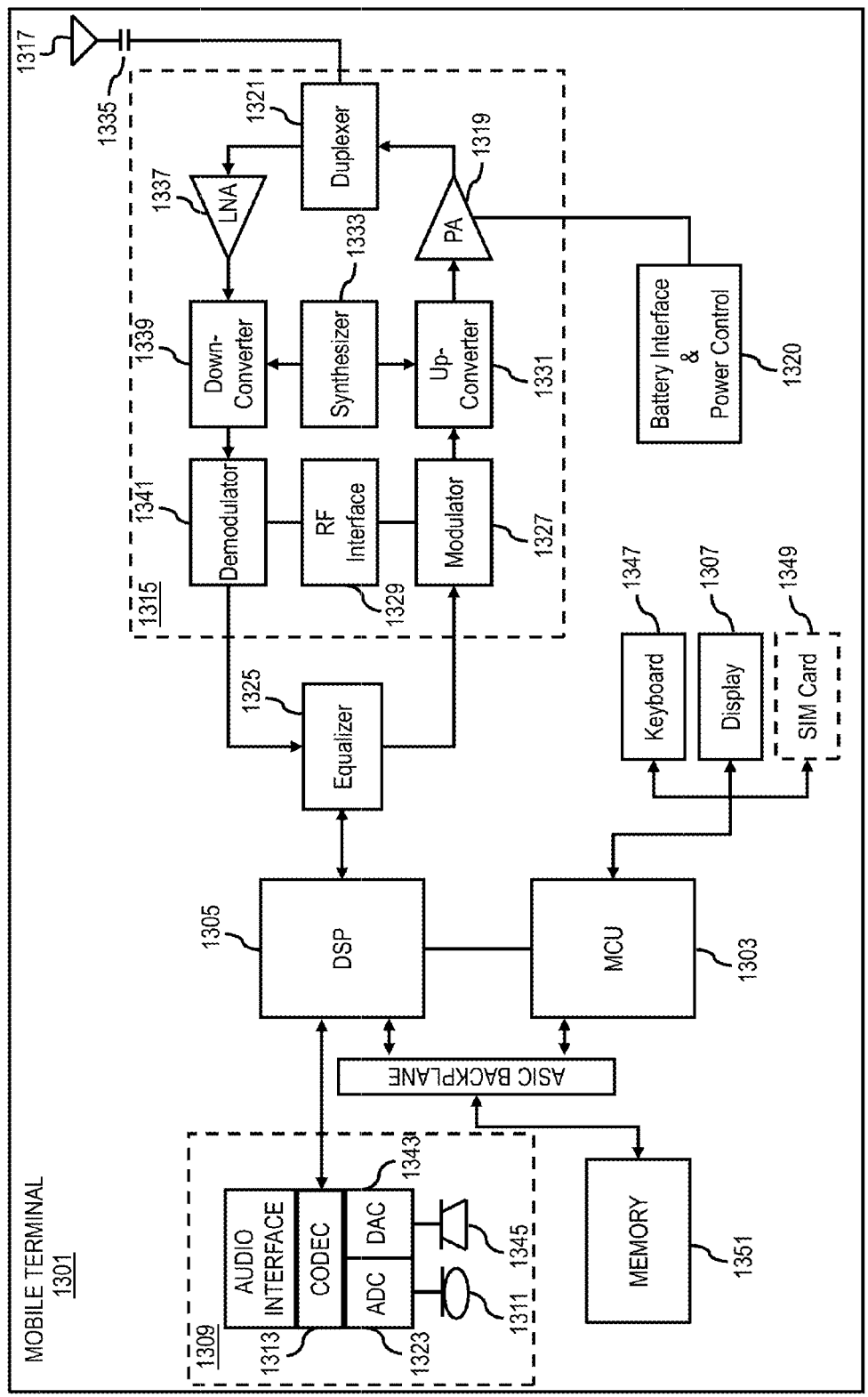
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of detecting points of interest or events based on geotagged data and geolocation seeds. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of detecting points of interest or events based on geotagged data and geolocation seeds. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to detect points of interest or events based on geotagged data and geolocation seeds. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network.

The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a processing of location information associated with a plurality of devices to determine one or more geolocation seeds, wherein the one or more geolocation seeds are one or more locations associated with one or more concentrations of the plurality of devices;
   a querying for user generated content information based, at least in part, on the one or more geolocation seeds; and
   a processing of the user generated content information to determine one or more points of interest, one or more location-based events, or a combination thereof,
   wherein the processing of location information comprises:
   determining one or more sets of clusters associated with the plurality of devices;
   determining one or more centers of the one or more sets of clusters;
   determining the one or more geolocation seeds based, at least in part, on the one or more centers;
   assigning one or more geographic dimensions to the one or more geolocations seeds;
   assigning one or more device-detection probability distributions across time to the one or more geolocation seeds; and
   assigning one or more historical device-staying cumulative times associated with the one or more geolocation seeds.

2. A method of claim 1, wherein the (1) data and/or (2) information and/or (3) at least one signal are further based, at least in part, on the following:
   a processing of the location information to determine a count of the plurality of devices associated with one or more candidate locations; and
   a designation of the one or more candidate locations as the one or more geolocation seeds based, at least in part, on a comparison of the count against a predetermined threshold count criterion.

3. A method of claim 2, wherein the (1) data and/or (2) information and/or (3) at least one signal are further based, at least in part, on the following:
   a processing of the location information to determine one or more stationary points, one or more contextually relevant points, or a combination thereof associated with the plurality devices,
   wherein the one or more candidate locations are based, at least in part, on the one or more stationary points, the one or more contextually relevant points, or a combination thereof.

4. A method of claim 2, wherein the (1) data and/or (2) information and/or (3) at least one signal are further based, at least in part, on the following:
   at least one determination of the count based, at least in part, on a number of unique devices concentrated at the one or more candidate locations.

5. A method of claim 1, wherein the (1) data and/or (2) information and/or (3) at least one signal are further based, at least in part, on the following:
   at least one determination of at least one search radius with respect to the one or more location seeds,
   wherein the querying for the user generated content information is based, at least in part, on the at least one search radius.

6. A method of claim 1, wherein the (1) data and/or (2) information and/or (3) at least one signal are further based, at least in part, on the following:
   at least one determination that the one or more points of interest, the one or more location-based events, or a combination are not previously included in at least one location-based data store; and
   a designation of the one or more points of interest, the one or more location-based events, or a combination as one or more candidate items.

7. A method of claim 6, wherein the (1) data and/or (2) information and/or (3) at least one signal are further based, at least in part, on the following:
   a verification of the one or more candidate items; and
   a storage of the one or more candidate items in the at least one data store based, at least in part, on the verification.

8. A method of claim 1, wherein the user generated content information includes, at least in part, geotagged user postings.

9. A method of claim 1, wherein the (1) data and/or (2) information and/or (3) at least one signal are further based, at least in part, on the following:
   at least one determination of the location information, the one or more location seeds, the user generated content information, the one or more points of interest, the one or more location-based events, or a combination thereof in substantially real-time, periodically, according to a schedule, on demand, or a combination thereof.

10. A method of claim1, wherein the location information includes, at least in part, substantially real-time information, historical information, or a combination thereof.

11. A method of claim 1, wherein the processing of location information further comprises:
    determining one or more shapes associated with the one or more geolocation seeds.

12. A method according to claim1, wherein the one or more concentrations of the plurality of devices are derived according to a metric indicating one or more densities of the plurality of the devices at various geographical locations.

13. An apparatus comprising:
    at least one processor; and
    at least one memory including computer program code for one or more programs,
    the at least one memory and the computer program code configured to, with the at least one processor, cause the apparatus to perform at least the following,
    process location information associated with a plurality of devices to determine one or more geolocation seeds, wherein the one or more geolocation seeds are one or more locations associated with one or more concentrations of the plurality of devices;
    cause, at least in part, a querying for user generated content information based, at least in part, on the one or more geolocation seeds; and process the user generated content information to determine one or more points of interest, one or more location-based events, or a combination thereof, wherein the location information is processed by:

determining one or more sets of clusters associated with the plurality of devices;

determining one or more centers of the one or more sets of clusters;

determining the one or more geolocation seeds based, at least in part, on the one or more centers:

assigning one or more geographic dimensions to the one or more geolocations seeds;

assigning one or more device-detection probability distributions across time to the one or more geolocation seeds; and assigning one or more historical device-staying cumulative times associated with the one or more geolocation seeds.

14. An apparatus of claim 13, wherein the apparatus is further caused to:

process the location information to determine a count of the plurality of devices associated with one or more candidate locations; and cause, at least in part, a designation of the one or more candidate locations as the one or more geolocation seeds based, at least in part, on a comparison of the count against a predetermined threshold count criterion.

15. An apparatus of claim 14, wherein the apparatus is further caused to:

process the location information to determine one or more stationary points, one or more contextually relevant points, or a combination thereof associated with the plurality devices, wherein the one or more candidate locations are based, at least in part, on the one or more stationary points, the one or more contextually relevant points, or a combination thereof.

16. An apparatus of claim 14, wherein the apparatus is further caused to:

determine the count based, at least in part, on a number of unique devices concentrated at the one or more candidate locations.

17. An apparatus of claim 13, wherein the apparatus is further caused to:

determine at least one search radius with respect to the one or more location seeds, wherein the querying for the user generated content information is based, at least in part, on the at least one search radius.

18. An apparatus of claim 13, wherein the apparatus is further caused to:

determine that the one or more points of interest, the one or more location-based events, or a combination are not previously included in at least one location-based data store; and cause, at least in part, a designation of the one or more points of interest, the one or more location-based events, or a combination as one or more candidate items.

19. An apparatus of claim 18, wherein the apparatus is further caused to:

cause, at least in part, a verification of the one or more candidate items; and cause, at least in part, a storage of the one or more candidate items in the at least one data store based, at least in part, on the verification.

20. An apparatus of claim 13, wherein the user generated content information includes, at least in part, geotagged user postings.

21. An apparatus of claim 13, wherein the apparatus is further caused to:

determine the location information, the one or more location seeds, the user generated content information, the one or more points of interest, the one or more location-based events, or a combination thereof in substantially real-time, periodically, according to a schedule, on demand, or a combination thereof.

22. An apparatus of claim 13, wherein the location information includes, at least in part, substantially real-time information, historical information, or a combination thereof.

23. An apparatus of claim 13, wherein the apparatus is further caused to:

determine one or more shapes associated with the one or more geolocation seeds.

* * * * *